(12) United States Patent
Wieczorek

(10) Patent No.: US 11,708,079 B2
(45) Date of Patent: Jul. 25, 2023

(54) METHOD, DEVICE, AND SYSTEM FOR INFLUENCING AT LEAST ONE DRIVER ASSISTANCE SYSTEM OF A MOTOR VEHICLE

(71) Applicant: MOTHERSON INNOVATIONS COMPANY LIMITED, London (GB)

(72) Inventor: Romeo Wieczorek, Stuttgart (DE)

(73) Assignee: Motherson Innovations Company Limited, London (GB)

( * ) Notice: Subject to any disclaimer, the term of this patent is extended or adjusted under 35 U.S.C. 154(b) by 1 day.

(21) Appl. No.: 17/097,435

(22) Filed: Nov. 13, 2020

(65) Prior Publication Data

US 2021/0129851 A1 May 6, 2021

Related U.S. Application Data

(63) Continuation-in-part of application No. PCT/EP2019/062419, filed on May 15, 2019.

(30) Foreign Application Priority Data

May 15, 2018 (DE) ..................... 10 2018 111 596.2

(51) Int. Cl.
*G08B 23/00* (2006.01)
*B60W 40/08* (2012.01)
*B60W 50/08* (2020.01)
*B60W 50/00* (2006.01)

(52) U.S. Cl.
CPC .......... *B60W 40/08* (2013.01); *B60W 50/087* (2013.01); *B60W 2040/0818* (2013.01); *B60W 2050/0075* (2013.01); *B60W 2420/42* (2013.01); *B60W 2420/52* (2013.01);
(Continued)

(58) Field of Classification Search
CPC ........ B60K 28/066; B60W 2040/0818; B60W 2050/0062; B60W 2050/0075; B60W 2050/0297; B60W 2420/42; B60W 2420/52; B60W 2540/043; B60W 2540/225; B60W 2540/229; B60W 30/10; B60W 30/14; B60W 40/08; B60W 50/02;
(Continued)

(56) References Cited

U.S. PATENT DOCUMENTS 10,762,785 B1 9/2020 Dewey et al.
10,810,966 B1 10/2020 Landgraf
(Continued)

FOREIGN PATENT DOCUMENTS

DE 102009005730 7/2010
DE 102016208405 6/2017
WO WO 2020/055992 A1 3/2020

OTHER PUBLICATIONS

International Search Report dated Sep. 18, 2019 of International application No. PCT/EP2019/062419.
(Continued)

*Primary Examiner* — Naomi J Small
(74) *Attorney, Agent, or Firm* — Jones Day

(57) ABSTRACT

The present disclosure relates to a method for controlling at least one drive assistance system of a motor vehicle, a device for carrying out the steps of this method and a system including such a device. The disclosure also relates to a motor vehicle including such a device or such a system.

16 Claims, 6 Drawing Sheets

(52) U.S. Cl.
CPC . *B60W 2540/043* (2020.02); *B60W 2540/225* (2020.02); *B60W 2540/229* (2020.02)

(58) Field of Classification Search
CPC . B60W 50/029; B60W 50/038; B60W 50/087
USPC ........................................................ 340/576
See application file for complete search history.

(56) References Cited

U.S. PATENT DOCUMENTS

| | | | | |
|---|---|---|---|---|
| 2003/0125855 A1* | 7/2003 | Breed | .................... | G06V 40/10 |
| | | | | 701/36 |
| 2008/0080741 A1* | 4/2008 | Yokoo | .................... | G08B 21/06 |
| | | | | 382/104 |
| 2010/0090839 A1* | 4/2010 | Omi | ...................... | B60K 28/04 |
| | | | | 340/576 |
| 2012/0212353 A1* | 8/2012 | Fung | .................... | B60W 10/18 |
| | | | | 701/1 |
| 2015/0328985 A1* | 11/2015 | Kim | ...................... | G08B 21/06 |
| | | | | 180/272 |
| 2016/0001781 A1 | 1/2016 | Fung et al. | | |
| 2018/0111628 A1 | 4/2018 | Tamagaki et al. | | |
| 2018/0304806 A1 | 10/2018 | Kim | | |

OTHER PUBLICATIONS

Written Opinion dated Sep. 18, 2019 of International application No. PCT/EP2019/062419.
European Search Report dated Mar. 29, 2022, of European Application No. EP 21 20 7207.

* cited by examiner

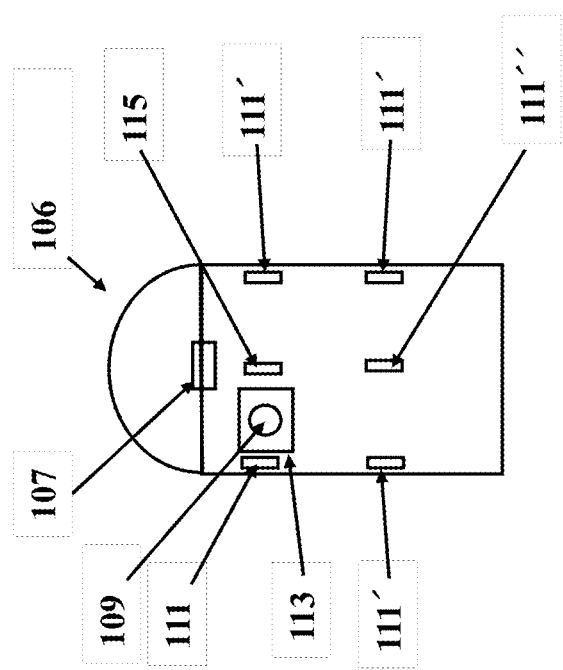

METHOD, DEVICE, AND SYSTEM FOR INFLUENCING AT LEAST ONE DRIVER ASSISTANCE SYSTEM OF A MOTOR VEHICLE

CROSS-REFERENCE TO RELATED APPLICATIONS

This application is a continuation-in-part of International Patent Application Publication No. PCT/EP2019/062419, filed May 15, 2019, which claims the benefit of priority to German Patent Application No. DE 10 2018 111 596.2, filed May 15, 2018, each of which is hereby incorporated by reference in its entirety for all purposes.

BACKGROUND

1. Field of the Invention

The present disclosure relates to a method for controlling at least one drive assistance system of a motor vehicle according to the preamble of claim 1, a device for carrying out the steps of this method and a system comprising such a device. The disclosure also relates to a motor vehicle comprising such a device or such a system.

2. Related Art

Drive assistance systems for motor vehicles are commonly known. At present, however, drive assistance systems, in particular brake assistants, of a motor vehicle may only intervene in case the best possible assurance is provided that, if a dangerous situation arises, the driver himself cannot intervene in time to avert an imminent danger.

In case of a brake assistant, for example, this means that the drive assistance system may intervene too late and begin to decelerate the vehicle such that emergency braking, for example in front of a crosswalk, only brings the vehicle to a timely halt at an initial speed of 30 km/h. However, this is not a completely satisfactory solution for many similar situations that occur in road traffic.

For example, cell phone use, desire to open a glove box, or conversation with other motor vehicle occupants while driving or other activities can lead to inattention or a loss of comfort of the driver of the motor vehicle.

US 2012/0212353 A1 describes a method for assessing driver behavior, comprising driver monitoring systems to accommodate for driver's slow reaction time, attention laps and/or alertness. As soon as the monitoring system detects a reduced reactivity or alertness of the driver, the operation of vehicle systems can be modified to prevent an accident.

US 2018/0111628 A1 discloses a travel control device for a vehicle, with a detection device for detecting an abnormality of a driver in order to activate a lane change assistant or a drive assistant as soon as an abnormal state of the driver is detected.

DE 10 2016 208 405 A1 reveals a method for operating a drive assistance system for a motor vehicle, wherein the viewing direction of the driver is monitored and compared with a set point value, and wherein an attention value of the driver is determined as a function of the viewing direction.

DE 10 2009 005 730 A1 refers to a method and a device for monitoring the attention of a driver, whereby the driver's viewing direction or information of a lane departure warning system is monitored to record a period of lack of attention.

SUMMARY

In one example, the present disclosure seeks to further develop the known method in such a way that a drive assistance system is provided which overcomes the disadvantages of the state of the art and in particular leads to a safer and more reliable intervention effect in dangerous situations.

In an aspect, a method for controlling at least one drive assistance system of a motor vehicle includes the following steps: receiving from at least one sensor at least one signal value representing at least one attention characteristic of at least one motor vehicle occupant; determining, based on said signal value, at least one attention state of said vehicle occupant; determining whether the attentional state of said vehicle occupant corresponds to a first attentional state; and in response to determining that the attention state corresponds to the first attention state, controlling the drive assistance system in a first way.

Preferably the following step can be included: In response to the determination that the attention state does not correspond to the first attention state, preferably the previously determined attention state corresponds to the first attention state, controlling the drive assistance system in a second way.

It may be that the signal value(s) at least concerns one of the following attentional characteristic(s): (i) at least one result of an evaluation of a period of time, during which the motor vehicle occupant does not participate in road traffic with his/her eyes, in particular the motor vehicle occupant having his/her eyes closed and/or the direction of vision of the motor vehicle occupant corresponds to a direction deviating from the direction of travel of the motor vehicle, detected by at least one first sensor; (ii) at least one result of an evaluation of a direction of vision of the motor vehicle occupant, in particular in the case of a direction of vision detected is deviating from the direction of travel of the motor vehicle, detected by at least one second sensor; (iii) at least one result of an evaluation of a position of at least one eyelid of the motor vehicle occupant, in particular a position of the eyelid of the motor vehicle occupant which is closed, half open and/or open, detected by at least one third sensor; (iv) at least one result of an evaluation of a period of time, during which the motor vehicle occupant does not participate in road traffic due to his/her head posture and/or during which the head posture corresponds to a head posture which is twisted, in particular laterally, downwards and/or upwards, detected by at least one fourth sensor; (v) at least one result of an evaluation of a head posture, in particular a head posture due to which the motor vehicle occupant cannot participate in road traffic and/or a head posture twisted sideways, downwards and/or upwards, detected by at least one fifth sensor; (vi) at least one result of an evaluation of a period of time, during which the motor vehicle occupant does not participate in road traffic due to his/her posture and/or during which the posture corresponds to a posture bent, in particular sideways and/or downwards, detected by at least one sixth sensor; (vii) at least one result of an evaluation of a posture, in particular a posture due to which the motor vehicle occupant does not participate in road traffic and/or a posture bent sideways and/or downwards, detected by at least one seventh sensor; (viii) at least one result of an evaluation of an environmental situation, in particular in the side, rear and/or front area of the motor vehicle, detected by at least one eighth sensor; (ix) at least one result of an evaluation of a number of vehicle occupants in the motor vehicle detected by at least one ninth sensor; and/or (x) at least one result of an evaluation of a number, in particular assigned to a first selection group, and/or type of further driver assistance systems activated in the motor vehicle, detected by at least one tenth sensor.

It may also be provided that (i) the signal value can assume a value between a lower and an upper limit value, in particular between zero and one, inclusive the respective value(s), wherein the lower limit value represents a lowest attention of the motor vehicle occupant and the upper limit value represents a highest attention of the motor vehicle occupant with respect to the attention characteristic represented by the signal value; (ii) in determining the attentional state of the motor vehicle occupant, the first attentional state is determined if at least one signal value falls below and/or exceeds a first limit value assigned to it; (iii) in determining the attentional state of the vehicle occupant, the signal values are evaluated and/or correlated, (iv) in determining the attentional state of the motor vehicle occupant, the signal values are weighted differently depending on the attention characteristic represented by them, in particular in case where the motor vehicle occupant does not participate in road traffic with his eyes, especially where the motor vehicle occupant has his/her eyes closed and/or the direction of vision of the motor vehicle occupant which corresponds to a direction different from the direction of travel of the motor vehicle, such that the signal values contribute less to the attentional state corresponding to the first attentional state than in case where the motor vehicle occupant does not participate in road traffic because of his head and/or body posture; and/or (v) it is determined that the attention state of the motor vehicle occupant corresponds to the first attention state if the number of further drive assistance systems activated in the motor vehicle exceeds a second limit value and/or if at least one and/or a number exceeds a third limit value of the further driver assistance systems of the motor vehicle, in particular that the attention state of the motor vehicle occupant corresponds to one assigned to at least a second selection group, further driver assistance systems of the motor vehicle are in an activated state.

Further, it may be that (i) controlling the drive assistance system in the first way comprises (a) transferring the drive assistance system from a first, in particular deactivated, operating state into a second, in particular activated, operating state, (b) changing, in particular reducing, at least one triggering threshold for an intervention of the drive assistance system and/or (c) manipulating, in particular reducing, a threshold value of the driver assistance system, the threshold value preferably controlling, comprising and/or representing at least one property of at least one function of the driver assistance system; (ii) controlling the drive assistance system in the second way comprises (a) transferring the drive assistance system from a second, in particular activated, operating state into a first, in particular deactivated, operating state, (b) changing, in particular increasing, at least one triggering threshold for an intervention of the drive assistance system and/or (c) manipulating, in particular increasing, a threshold value of the driver assistance system, the threshold value preferably controlling, comprising and/or representing at least one property of at least one function of the drive assistance system; (iii) the first state of attention represents and/or represents an inattention; (iv) the vehicle occupant is the driver of the motor vehicle; (v) the drive assistance system comprises at least one braking assistant, in particular in conjunction with a PreSafe system and/or pedestrian detection, at least one lane departure warning system, at least one steering assistant, in particular with integrated distance keeping and/or integrated Distronic, at least one distance keeping assistant, at least one pursuit assistant, in particular comprising at least one speed adaptation, at least one avoidance assistant, in particular for braking instead of taking evasive action when the driver is inattentive, and/or at least one blind spot assistant, in particular an active blind spot assistant, preferably to be set for a short time when the driver is inattentive in order to prevent an unwanted change of lane; and/or (vi) the further driver assistance systems comprise at least one drive assistance system from the group comprising brake assistant, in particular in conjunction with a PreSafe system and/or pedestrian detection, lane departure warning system, steering assistant, in particular with integrated distance keeping and/or integrated Distronic, distance keeping assistant, pursuit assistant, in particular comprising at least one speed adjustment, avoidance assistant, in particular for braking instead of avoiding in the event of inattention of the driver, and/or blind spot assistant, in particular an active blind spot assistant, preferably in order to be adjusted briefly in the event of inattention of the driver in order to prevent an undesired change of lane.

When monitoring a vehicle occupant, in particular the driver, with a sensor like a TOF camera, it is not only possible to detect inattention, but also to detect certain patterns of movement that indicate what the driver is doing or what he wants to do. A TOF camera trained with artificial intelligence can train the movement patterns in particular through the head angle and upper body movement.

One unique movement pattern is for example provided when reading a text message on a cell phone hold in one hand while driving. The pattern is defined by the driver reading in short intervals by looking down, aligning the cell phone and then looking forward again. As soon as that movement pattern has been recognized, appropriate measures can be taken. The driver can be warned or partially autonomous assistants can be switched on.

Another unique movement pattern is for example provided when opening a glove box that can be opened electrically. The pattern is defined by the driver moving in the direction of the glove box to open the glove box without the need for a sensor in the glove box.

In a further aspect of the disclosure, a device for controlling at least one drive assistance system of a motor vehicle, includes at least one processor unit which is arranged to carry out the steps of the method of the disclosure.

In an even further aspect of the disclosure, a system for controlling at least one drive assistance system of a motor vehicle, includes at least one device according to the disclosure and at least one first, second, third, fourth, fifth, sixth, seventh, eighth, ninth and/or tenth sensor.

It may be that (i) the first, the second and/or the third sensor comprises and/or represents at least one eye-tracking sensor, in particular the first, the second and/or the third sensor is/are at least partially implemented in one and/or comprises and/or represents the same eye-tracking sensor; (ii) the fourth, fifth, sixth and/or seventh sensor comprises at least one body tracking sensor, in particular a depth measurement sensor, a time-of-flight sensor, and/or at least one, preferably a plurality of lighting units, in particular spaced and/or separated from the first, second, third, fourth, fifth, sixth and/or seventh sensor, preferably in form of infrared lighting unit(s), wherein preferably the fourth, fifth, sixth and/or seventh sensor is/are at least partially implemented in one and/or comprises and/or represents the same body tracking sensor; (iii) the eighth sensor comprises and/or represents at least one camera, in particular front and/or rear camera, at least one radar sensor, at least one lidar sensor and/or at least one surround view system; (iv) the first, second, third, fourth, fifth, sixth, seventh, eighth, ninth and/or tenth sensors are at least partially formed in one and/or comprise and/or represent at least one hardware sensor and/or at least one software-based design, and/or (v) the first, second, third, fourth, fifth, sixth, seventh, eighth, ninth and/or tenth sensor is/are included in at least one rearview device.

In another aspect, a motor vehicle includes at least one device according to the disclosure and/or at least one system according to the disclosure.

By monitoring at least one state of attention of at least one motor vehicle occupant, in particular the driver of a motor vehicle, an occurring first state of attention, in particular inattention, of the motor vehicle occupant can be detected early and, in conjunction with this detection, at least one drive assistance system can be controlled so that the drive assistance system can accordingly assume responsibility early on and initiate suitable measures to reduce the risk in good time.

The control cannot only be an activation of a previously non-activated drive assistance system, but alternatively or additionally in particular also a change of at least one triggering threshold for an intervention of the drive assistance system. This makes it possible that in case of inattention of the vehicle occupant the drive assistance system can intervene in the event of inattention much earlier than is currently the case. If the first state of attention is detected, it is no longer necessary to wait for the latest possible moment for the vehicle occupant to intervene, but appropriate precautionary measures can be taken immediately. This not only increases the safety of the occupants of the vehicle in question, but also of all other road users.

It has been shown that in order to determine the attentional state of the vehicle occupant, one, but especially two and more signal values are evaluated and/or related to each other. Each signal value represents an attention characteristic of the vehicle occupant.

In this context, an attentional characteristic in the sense of this disclosure is to be understood as an aspect which allows conclusions to be drawn about the present and future attention of the vehicle occupant. For example, the direction of gaze, the head posture and the body posture of the motor vehicle occupant have been identified by the inventors as suitable criteria for drawing conclusions about the current attention of the motor vehicle occupant. Alternatively or additionally, the duration, i.e. the time component, of a distraction can be taken into account. But also aspects not related to the person of the vehicle occupant can be suitable for the assessment of the attention of the vehicle occupant. Thus, it was recognized that for example the surrounding situation of the motor vehicle can be included advantageously in the determination of the attention condition.

The individual signal values are received by a corresponding sensor, in particular the sensor that sends the signal values. The respective sensor can be preferably a hardware sensor and/or a software-based sensor. The signal values can preferably take a signal value between a lower and an upper limit value, especially between zero and one. This offers a very reliable possibility to combine and correlate the signal values of different sensors. For example, the lower limit value represents the lowest level of attention of the vehicle occupant and the upper limit value represents the highest level of attention of the vehicle occupant with respect to the attention characteristic represented by the signal value.

In this context, it is particularly advantageous if the different signal values are weighted differently when determining the state of attention. This makes it easy to take into account that the attentional characteristic concerning the direction of gaze of the vehicle occupant contributes less to the existence of the first attentional state than the attentional characteristic concerning the head and/or body posture.

For example, a signal value of a first attention feature indicating a high degree of inattention (for example, the upper limit value) and a signal value of a second attention feature indicating a low degree of inattention (for example, the lower limit value) may be present. If the signal value of the first attention feature is strongly weighted and the signal value of the second attention feature is weakly weighted, the first attention state is determined. Conversely, if the signal value of the first attentional feature is weakly weighted and the signal value of the second attentional feature is strongly weighted, an attentional state deviating from the first attentional state could be determined.

It has also proved to be particularly effective if the number and/or type of other driver assistance systems activated in the vehicle, especially those assigned to a first selection group, is used as a further attention feature. Since the activation of further driver assistance systems by the driver can regularly lead to the conclusion that the driver feels safe, this can be considered very advantageously as an aspect of impending inattention when determining the state of attention. Thus, if a drive assistance system is activated, braking can be initiated immediately if objects on the road are detected.

By using suitable sensors, especially time-of-flight sensors, body and head rotations can be detected and evaluated in a particularly effective way, preferably by means of appropriate distance measurement. Preferably, at least one infrared illumination unit is used, which illuminates and/or defines the detection range of the sensor.

Such a sensor, especially a Time-Of-Flight (TOF) sensor, can be designed as a camera and/or have its own lighting unit to actively illuminate the area in front of the camera.

These sensors, in particular TOF sensors, can be improved by providing an additional lighting unit, i.e. one that is separate from the sensor or the detection element of the sensor, and/or arranged at a distance. It has turned out that for the recognition of the vehicle occupant by means of the sensor, such as a hand or a head, the unambiguous identification of a gesture, a line of sight, a head position and movement and/or facial expressions of the vehicle occupant is particularly important. A clear recognition must be ensured even at greater distances from the sensor, especially from the camera. In order to be able to ensure this recognition even at greater distances, an improved illumination of the depth range can be achieved with the lighting unit. Thus, the camera system can provide sufficient data even at greater distances, which allow the method according to the disclosure to make a clear statement about the attentional characteristic of the vehicle occupant. In particular, even with different seating positions, it is ensured that the vehicle occupant is sufficiently illuminated and/or that the vehicle occupant is completely within the detection range of the sensor. The lighting unit may emit electromagnetic radiation outside the range visible to the vehicle occupant, such as the infrared range. This avoids dazzling the vehicle occupant, especially at high light intensities to achieve a high depth range in the illumination.

Therefore, the recognition of the attentional characteristic of the vehicle occupant and, thus, the controlling of the drive assistance system can be performed with higher reliability.

With such sensors, in particular TOF sensors, an illumination of different areas in the interior of the motor vehicle can be carried out by the lighting unit, preferably arranged separately from the sensor, in such a way that it is adapted to the state of the vehicle occupant, the motor vehicle and/or the environment of the motor vehicle and/or the distance of the vehicle occupant to the camera and/or sensor. Thus, the illumination can be changed by means of the lighting unit, preferably several lighting units, preferably based on these parameters.

Both the sensor, preferably in the form of the camera and/or the TOF sensor, and the additional lighting unit, in particular a large number of additional lighting units, can be installed, for example, in a dashboard, a center console, in particular a retractable or movable center console, a windshield, a roof, a headliner, a handle, an A-pillar, a B-pillar, a C-pillar, a door component, above a door, a housing, in particular a dome-shaped housing in the region of the center of the motor vehicle on the roof or headliner, a display device, a motor vehicle vehicle occupant seat, in particular a head part, a foot part and/or an armrest of the motor vehicle vehicle occupant seat, a restraint system for the motor vehicle vehicle occupant, a positioning mechanism, in particular a motor-driven positioning mechanism, a covering and/or the device, in particular in the form of a mobile device of the object, be attached or integrated therein.

BRIEF DESCRIPTION OF THE DRAWINGS

Further features and advantages of the disclosure result from the following description, in which preferred embodiments of the disclosure are explained by means of schematic drawings and diagrams.

FIG. 10 shows a schematic top view of a motor vehicle with additional lighting units.

DETAILED DESCRIPTION

Figure 1:
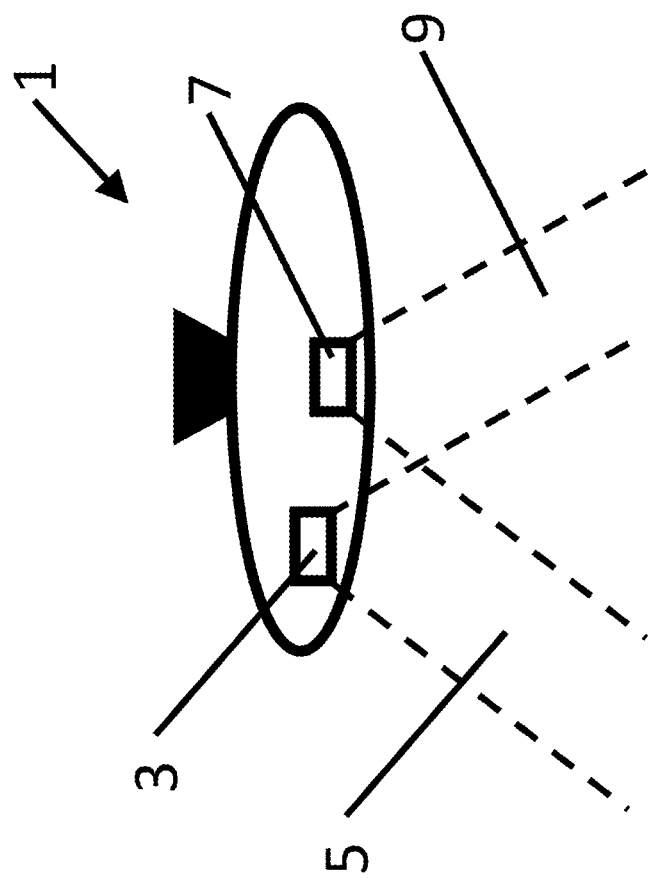
FIG. 1 shows an arrangement of sensors within a rearview device.

FIG. 1 shows a rearview device 1 in the form of a rearview mirror in the interior of a motor vehicle from the perspective of the vehicle occupant, in particular the driver, arranged in an otherwise unspecified motor vehicle.

The rearview device 1 includes an eye-tracking sensor 3, which follows the eye movements of the vehicle occupant and thus makes it possible to determine the direction of vision of the vehicle occupant, especially if the direction of vision deviates from the direction of travel of the vehicle. In addition, the same eye-tracking sensor 3 makes it possible to determine the period of time during which the vehicle occupant's eyes are not participating in road traffic, in particular when the vehicle occupant's eyes are closed and/or the direction of vision of the vehicle occupant is in a direction different from the direction of travel of the vehicle.

From the eye-tracking sensor 3 the signal values representing the two attention characteristics can be received accordingly.

The sensor 3 has a detection range 5, within which it can track the eyes of a vehicle occupant. Preferably, not only the area of the driver's seat is covered by the detection range 5, but also at least the area of the center console. This means that even a motor vehicle driver who bends to the side still moves within the detection range 5 and can thus be reliably followed by the eye-tracking sensor 3.

The rearview device 1 also includes a Time-Of-Flight (TOF) sensor 7 with an additional infrared illumination unit. The TOF sensor 7 can detect the objects located within a detection range 9. In the acquired image, the TOF sensor 7 can calculate a distance value for each pixel in relation to a reference point, for example the rearview device 1. The TOF sensor 7 can thus detect and evaluate the head and body posture of the vehicle occupant.

This makes it possible to determine the length of time during which the motor vehicle occupant does not participate in road traffic because of his head position and/or during which the head position corresponds to a head position that is twisted, in particular sideways, downwards and/or upwards. It is also possible to determine the head position, in particular a head position in which the occupant is not participating in road traffic and/or a head position twisted sideways, downwards and/or upwards.

The TOF sensor 7 also makes it possible to determine the length of time during which the motor vehicle occupant is not participating in road traffic due to his/her posture and/or during which the posture corresponds to a posture bent, especially sideways and/or downwards. It is also possible to determine the posture, in particular a posture in which the motor vehicle occupant does not participate in road traffic and/or a posture bent to the side and/or downward.

From the TOF sensor 7, the signal values representing four attentional characteristics can be received accordingly.

Figure 2:
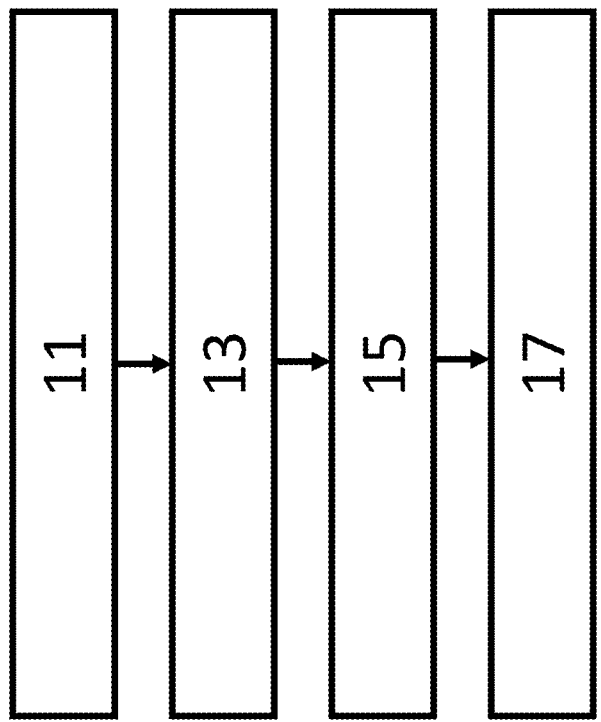
FIG. 2 shows a flow chart of a method according to a first aspect of the disclosure.

FIG. 2 shows a flow chart comprising method steps according to the first aspect of the disclosure:

In a step 11 of the method the six signal values representing attention characteristics (direction of gaze, duration of averted gaze, head posture, duration of averted head posture, body posture, duration of averted body posture) of the vehicle occupant are received by the eye-tracking sensor 3 and the TOF sensor 7.

In a step 13 at least one attention state of the vehicle occupant is determined on the basis of the signal values.

In a step 15 it is determined whether the attention state of the vehicle occupant corresponds to a first attention state, in particular inattention.

In a step 17, in response to the determination that the attention state corresponds to the first attention state, the drive assistance system is controlled in a first way.

Figure 3:
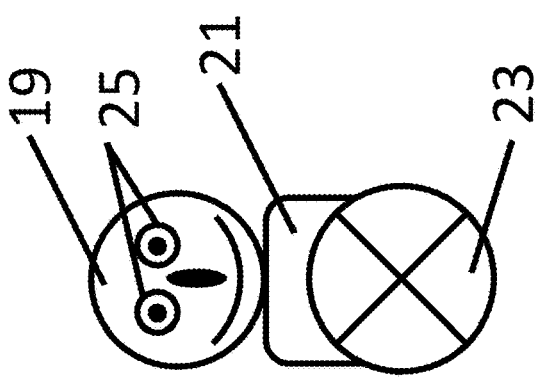
FIG. 3 shows a first situation of a motor vehicle occupant.

FIG. 3 shows a first situation of a vehicle occupant, in particular the driver, in the otherwise unspecified vehicle, including the rearview device 1 of FIG. 1. The motor vehicle occupant, comprising a head 19 and an upper body 21, is located behind the steering wheel 23 of the motor vehicle. The eyes 25 of the vehicle occupant look straight ahead in the direction of travel. Both the head 19 and the upper body 21 are in a correct posture, i.e. a posture in which the vehicle occupant, in particular the driver, can be expected to follow the traffic with maximum attention.

Accordingly, in this first situation in step 11, both the eye tracking sensor 3 and the TOF Sensor 7 receive a signal value of one (1) each with respect to the direction of gaze, head position and body posture, corresponding to maximum attention. Correspondingly, a state of attention other than the first one is determined in steps 13 and 15. Thus, the drive assistance system is not controlled in the first way.

Figure 4:
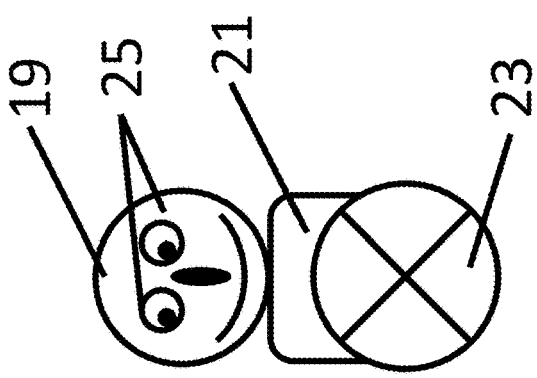
FIG. 4 shows a second situation of a motor vehicle occupant.

FIG. 4 shows a second situation of the vehicle occupant. As in the first situation, both head 19 and upper body 21 are in a correct posture. However, in step 11, the eye-tracking sensor 3 receives a signal value with respect to the direction of gaze of zero (0), which represents minimal attention with respect to this attention feature. The reason for this is the vehicle occupant's gaze towards, from his or her point of view, the glove compartment at the bottom right.

Whether the first state of attention is determined in steps 13 and 15 depends on the signal value regarding the attentional characteristic concerning the duration of the averted gaze. Only when the motor vehicle occupant's gaze no longer turns away from the road ahead for a short time is the first attentional state determined in step 13 and determined in step 15, and the drive assistance system is controlled in the first way in step 17. This is because in this case it can be assumed that the vehicle occupant is distracted.

Figure 5:
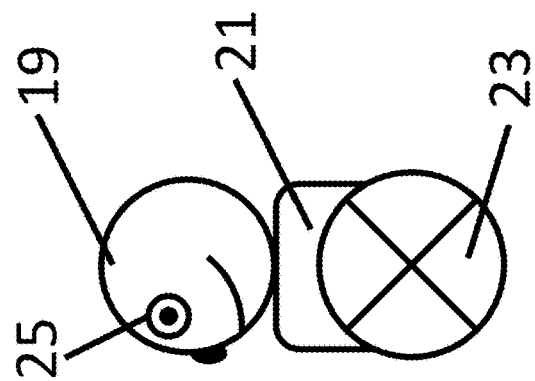
FIG. 5 shows a third situation of a motor vehicle occupant.

FIG. 5 shows a third situation of the vehicle occupant. This third situation represents the typical situation of a conversation between the vehicle occupant and other vehicle occupants, especially the vehicle occupant.

As in the first and second situation, the upper body 21 is in the correct position. However, in step 11, the eye-tracking sensor 3 receives a signal value of zero (0) with respect to the direction of gaze and the TOF sensor 7, due to the laterally twisted head 19, also receives a signal value of zero (0) with respect to the head posture. In steps 13 and 15, the first state of attention is determined on this basis. Then, in step 17, the drive assistance system is controlled in the first way. In this case, the brake assistant is activated and at least one triggering threshold for intervention by the brake assistant is reduced, since the third situation is classified as particularly critical.

Figure 6:
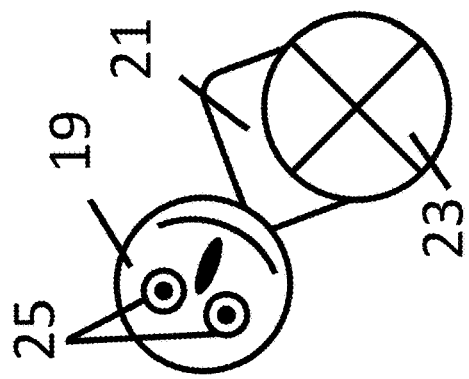
FIG. 6 shows a fourth situation of a motor vehicle occupant.

FIG. 6 shows a fourth situation of the vehicle occupant. This fourth situation represents the typical situation in which the vehicle occupant bends to the side of the glove compartment. In step 11, the eye-tracking sensor 3 receives a signal value regarding the viewing direction of one (1), since the gaze is still directed to the roadway and therefore maximum attention is paid to this. However, the signal values received by the TOF sensor 7 are now zero (0) with respect to both the head position and the body position and represent minimum attention with respect to these attention characteristics.

Due to the weighting of the individual signal values, the first state of attention is only determined in steps 13 and 15 when head 19 and upper body 21 have been turned for a certain period of time. Before that, however, the first attention state is not determined and established.

Although situations one to four of FIGS. 3 to 6 have been described here with signal values of either zero (0) or one (1), the expert understands that any value between the lower and upper limits can be assumed by the signal. For example, if the upper body 21 is flexed from the correct driving posture, the TOF sensor 7 could receive a changing signal value from one towards zero over time.

In monitoring a vehicle occupant, in particular the driver, with at least one TOF sensor, not only can one recognize inattentiveness of the driver, but also recognize certain patterns of movement that suggest what the driver is doing or what he is about to do simultaneously to driving or maybe even instead of driving, as illustrated with respect to FIGS. 3 to 6.

Depending on the recognized movement pattern the inattentiveness can be determined qualitatively to optimize the selection of the appropriate drive assistance system(s) to be initiated.

Typical movement patterns can be recognized through head angle position and upper body movement, as described above with reference to FIGS. 3 to 6. The determination of movement patterns may, however, be made in many different ways, for example using shoulder recognition and face recognition as described further in the following.

In an example, an image obtained of the upper body can be a single channel image such that the image input is provided in greyscale model. The head may be selected as a reference object and a rectangle may be provided around a detected upper body in an image. A factor for rescaling the image from one layer to another may be applied, for example with steps of a 10% reduction within upper and lower limits of object sizes. If the object size is larger than the upper limit or smaller than the lower limit, the object may be ignored by the model.

Figure 7:
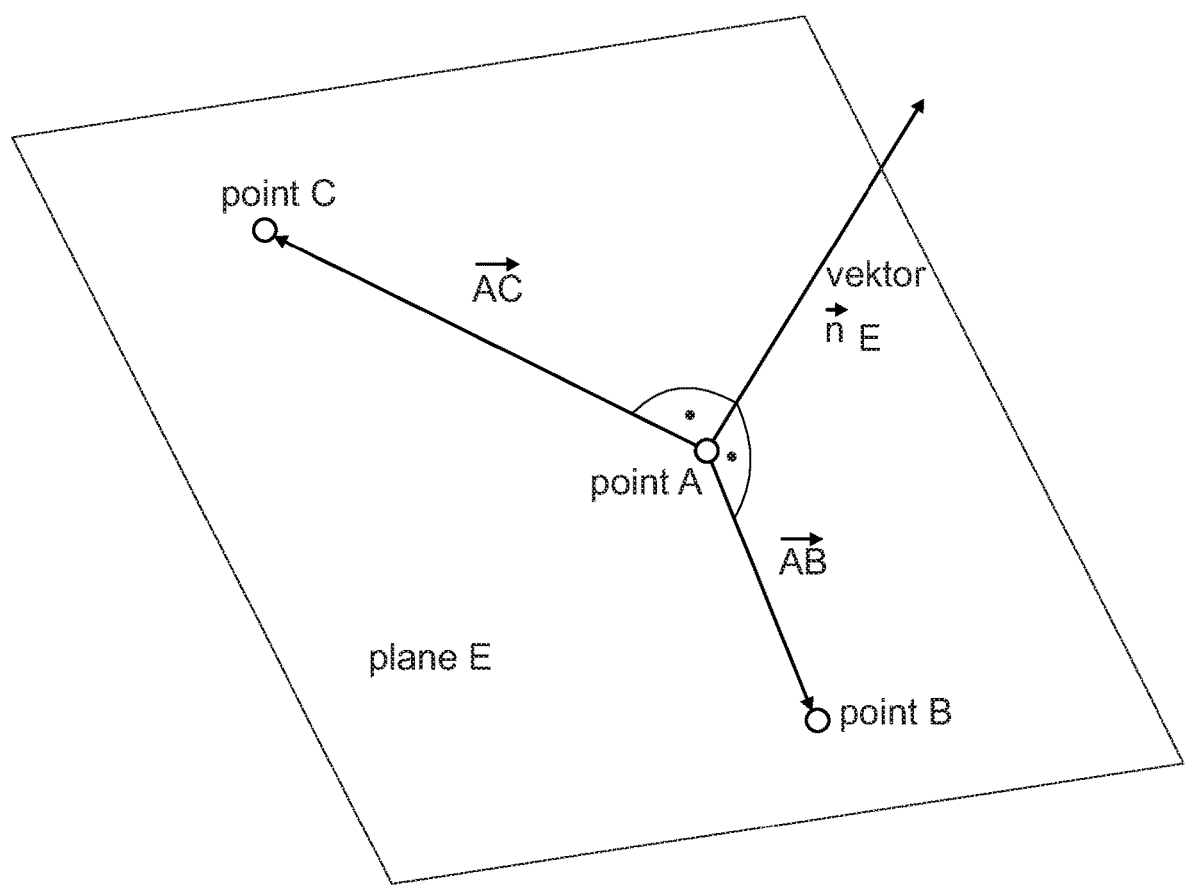
FIG. 7 shows a shoulder plane of a motor vehicle occupant for illustrating the determination of a movement pattern.
Figure 8:
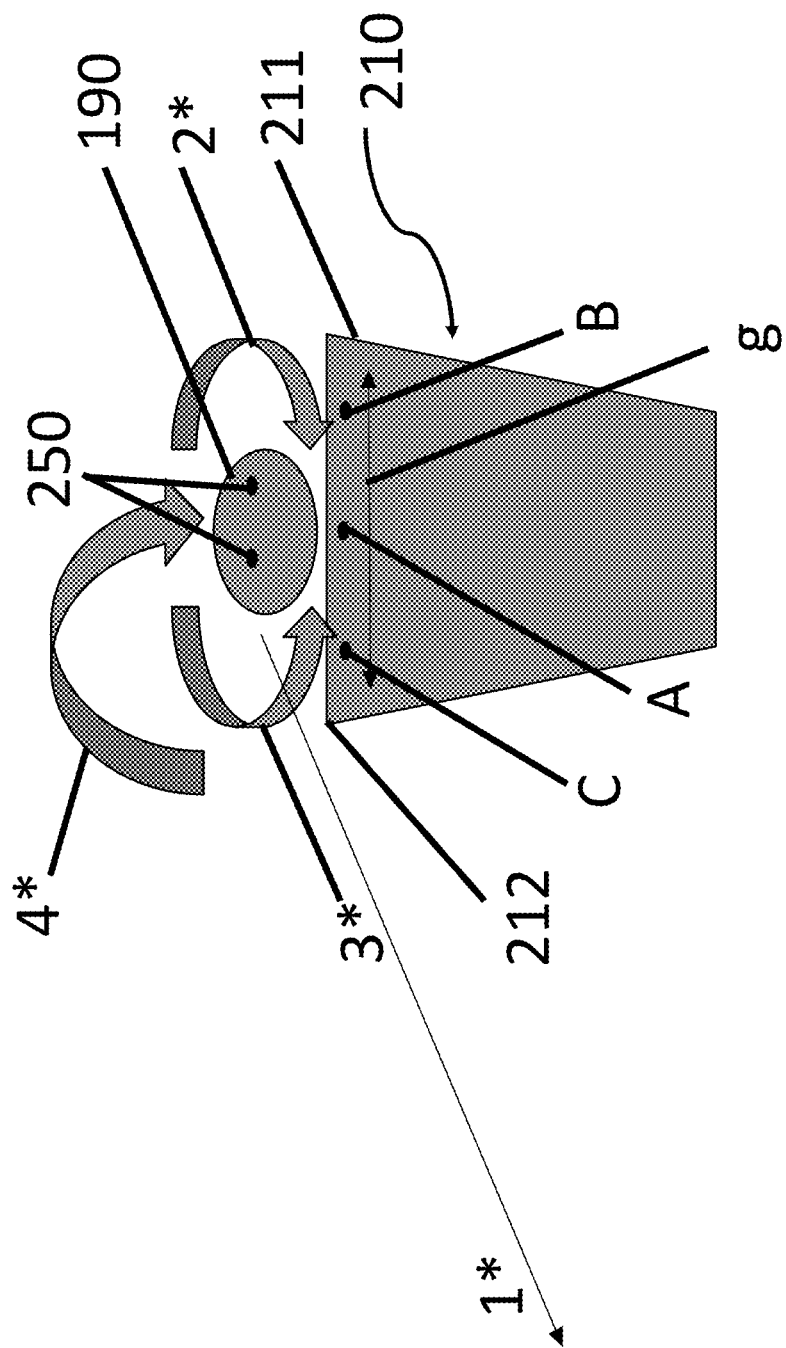
FIG. 8 shows a motor vehicle occupant with a head rotation as well as tilting and a shoulder rotation for illustrating the determination of a movement pattern.

After extracting the upper body from the image, shoulder positions can be determined. 3 points A, B, C may be placed in a plane E as shown in FIG. 7 or on a straight line g running from the left shoulder to the right shoulder as shown in FIG. 8. Said 3 points move when the upper body is moved, in particular turned to the right or the left. Moved points can be presented differently, for example with different colors.

Turning to FIG. 7, the shoulder recognition may be performed with the help of points C and B characterizing the two shoulders and point A being arranged in-between. The 3 points A, B and C are defining the plane E that is set at an angle with respect to the plane of a not shown windshield.

As shown in FIG. 7, one reference vector n being a normal vector of the plane E and pointing to the correct viewing direction of the driver, is mapped from said 3 shoulder points A, B, C. In detail, a first vector $\overrightarrow{(AB)}$ may be calculated by subtracting the point A from the point B, and a second vector $\overrightarrow{(AC)}$ may be calculated by subtracting point A from the point C, such that the vector $\overrightarrow{n}$ can be determined by cross product of the first and second vectors. Therefore the vector $\overrightarrow{n}$ is perpendicular to the first and second vectors and, thus, perpendicular to the plane E.

After determining the shoulder positions at points C and B, a straight line $\overrightarrow{g}$ is formed between said points. If the upper body is recognized, the shoulder angle y between the vectors $\overrightarrow{g}$ and $\overrightarrow{n}$ is calculated as well as the distances of the points C and B from a sensor, in particular a TOF camera, used for determining the attentional state of the driver.

Still further, a face recognition can be performed. Even if only half of the face is visible to the TOF camera, using a well-known shape predictor for nose, mouth and eyes allows to extract for example 68 points of the face for evaluation purposes. For example, depending on the rotation of the head, points from the ear to the chin on the side seen from the TOF camera can be extracted and set in relation to the windshield to determine the rotation of the head.

Turning to FIG. 8, which shows a head 190 with two eyes 250 as well as an upper body 210 with two shoulders 211, 212. The points A (middle), B (left shoulder) and C (right shoulder) are arranged on a straight line g. In addition, a vector can be obtained from points from the ear (not shown) to the chin (not shown) such that a normal vector thereto points vertically forward in the vehicle. Said normal vector can be designated as 0° y, with head rotations to the left or right are defined by +y° or −y°, respectively, and are indicated by the arrows 2* and 3*. A pitch angle determination is performed relative to the same normal vector and allows head angle calculation for a head tilt up and down. This results in a +x° or −x° rotation, with a downward tilt being shown with the arrow 4\* in FIG. 8.

For a shoulder rotation determination, for example to the right as indicated with arrow 1\* in FIG. 8, a straight line is drawn through the 3 points C, A, B to build a normal vector (not shown) to the front.

Figure 9B:
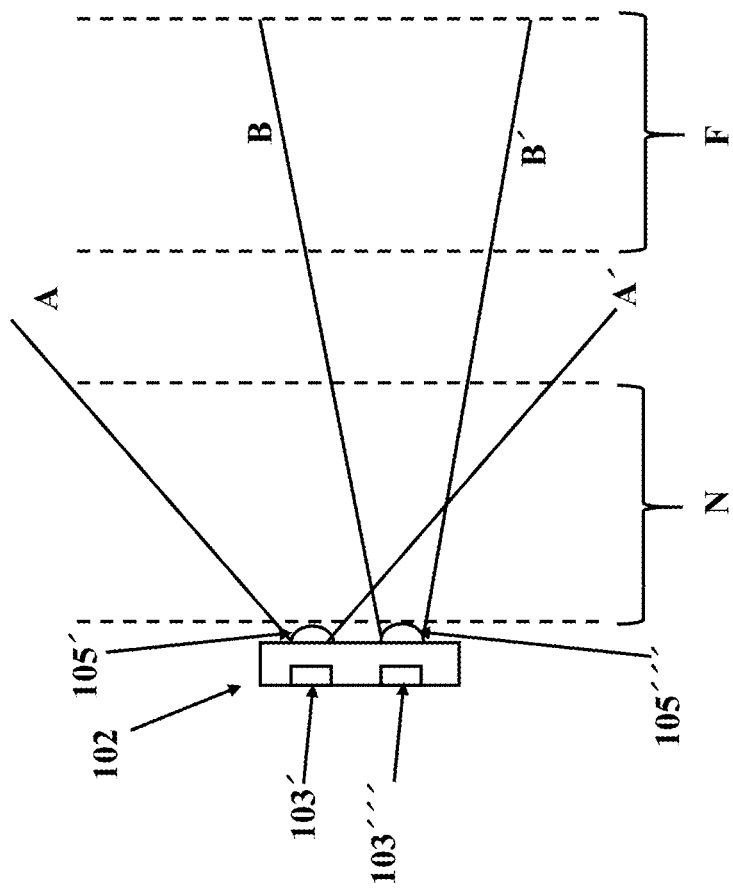
FIGS. 9a and 9b show an exploded view and a side view of an exemplary additional lighting unit, respectively.
Figure 9A:
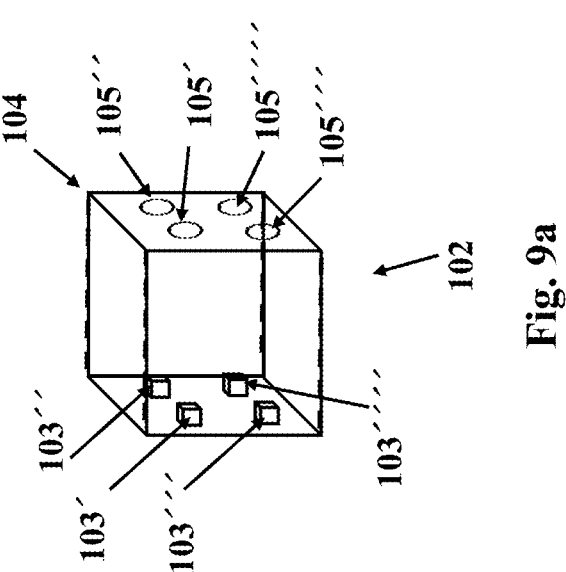

Each one of the arrows 1\*, 2\*, 3\* and 4\* also define a rotational range for determining movement patterns, with different movement patterns being listed in the following table for the left-hand driving of motor vehicles:

The light unit 102 comprises the light sources 103' to 103'''' shown in the exploded view in FIG. 9a together with optical elements 105' to 105'''' of an optical system 104, with each of optical elements 105' to 105'''' being associated with one of the light sources 103' to 103'''', connected downstream of the respective light source 103' to 103''''. Thus, for example, a near field can be illuminated by activating the light source 103' and a far field can be illuminated by activating the light source 103'''.

As indicated in the side view in FIG. 9b, the light beams widen with increasing distance from the light unit 102. The area illuminated by the light source 103' is limited to the area

TABLE

| | Shoulder rotation angle | Head rotation angle | Additional eye tracking |
|---|---|---|---|
| Opening glove box. | Movement to the right-straight line g through left shoulder/middle/right shoulder (points A, B, C) is tilted such that right shoulder is more than 10° below left shoulder | Head rotation between 20°-60° in short frequencies of permanent + movement to the right - until out ot range 2\* | Move to the right until out of range \*1 |
| Writing text message on cell phone | Shoulder rotation between 0-10° | Head rotation with y = +−10° to the left and to the right 2\*/3\* <br> Head tilting downwards with x = −(10-60°) \*4 <br> Head tilting downwards with high frequency alternating with x = (−5°-+10°) | Move downwards <br><br> High frequency alternating with eye tracking 0° + −5° |
| Conversation with co-driver | Shoulder rotation between 0-10° | Head rotation With high frequency with y = 50-90° or out of range 2\*/3\* | High frequency with out of range 2\*/3\* |
| Looking at children on back seats | Shoulder rotation between 30-90° | Head rotation with up to 90° to the left or to the right | out of range 2\*/3\*, eyes no longer visible |

The above table describes the determination of 4 typical movement patterns, namely
 opening glove box,
 writing text message on a cell phone,
 conversation with co-driver and
 looking at children on back seats,
for a left-hand driving, with the respective parameters defined via a rotation and tilting of the head and the shoulders of a driver.

Different movement patterns can be trained with the help of artificial intelligence to further improve a drive assistance system selection.

Artificial intelligence is in particular useful when different shoulder rotation angles and/or head rotation angles can be the result of a different movement. For example, the respective angles might be identical for opening a glove box and putting the hand on the knee of a co-driver. In order to distinguish the two movements from each other, a plurality of stored images can be evaluated based on artificial intelligence.

Further, the determination of a movement pattern can comprise a simulation of different sizes of driver and the like.

Accordingly, the information obtained solely from the information listed in above table might not be sufficient to define an exact movement pattern, but already allows to select an appropriate drive assistance. The fine tuning of the drive assistance can be achieved by making usage of artificial intelligence with a sufficient amount images on different movements of different people having different sizes and of simulations.

A light unit 102 suitable for use in a method, system and motor vehicle according to the disclosure is shown in FIGS. 9a and 9b. The light unit 102 has a matrix of light-emitting diodes (LED) 103' to 103'''' and thus a matrix optic, as in a lens array.

between two illumination boundaries A and A', while the area illuminated by the light source 103''' is limited to the area between illumination boundaries B and B', in the shown example. Because the available light intensity is distributed over a larger spatial field, the depth illumination decreases at the expense of the illumination field size. Thus, although a large spatial field perpendicular to the direction of light propagation in the near field N can be illuminated with the light source 103', the light intensity is no longer sufficient to illuminate the depth range in the far field F in order to be able to perform object recognition. On the other hand, although the light source 103''' can be used to illuminate the depth range in the far field F, the illuminated range in the near field N is smaller than with the light source 103', so that a near object may not be completely detected. The light sources 103'' and 103'''' can be used at medium distances to achieve increased illumination.

Alternatively, at least one of the light sources 103'' and 103'''' can also be used to illuminate the area or a partial area outside the illumination range of the light source 103'''' in far field F. By using several light sources, the required spatial illumination can be composed of several light sources.

It goes without saying that light propagation always takes place in three-dimensional space and not, as shown here as an example, in a two-dimensional plane.

Even if the arrangement of the light sources 103' to 103'''' in FIGS. 9a and 9b is shown in a plane plane and a regular pattern, a curved or otherwise shaped surface may be provided to accommodate the light sources 103' to 103''''. Thus, the direction of the light emission and the distance of the respective light source 103' to 103'''' to the respective optical element 105' to 105'''' can be preset. The number of light sources can also be increased or decreased, depending on the area to be illuminated and the available space. The optical elements 105' to 105'''' of the optical system 104 can also be arranged on a curved or otherwise shaped surface to optimally illuminate the area to be illuminated.

FIG. 10 shows exemplary positions where corresponding light units can be arranged within a motor vehicle 106 to achieve the best possible illumination.

In the 106 motor vehicle, a TOF sensor 107 is integrated into a rearview device in the form of an interior mirror. However, the sensor 107 can also be placed in other positions, such as the dashboard, so the positioning in FIG. 10 is only exemplary.

Several lighting units are arranged in the vehicle 106. In order to achieve the best possible illumination of a vehicle occupant 109 for the sensor 107, especially partially from the side, a lighting unit is integrated into the vehicle occupant seat 113. In addition or as an alternative, a lighting unit, as shown in FIG. 10, can be installed in a grab handle 111, for example above the driver's door. Such a lighting unit can also be provided as an alternative or supplement in further grab handles 111' on the vehicle occupant side or in the rear. In addition, it may be intended to install additional grab handles 111" in a vehicle interior in order to facilitate the movement and/or securing of vehicle occupants in an at least partially autonomous motor vehicle, which can then of course also be equipped with corresponding lighting units.

Furthermore, at least one lighting unit can be arranged on the roof liner, for example the roof liner area 115. This allows a good illumination of the vehicle occupant 109 also from above. This positioning also makes it possible to illuminate the central area of the vehicle interior particularly well. Advantageously, the lighting unit is housed inside a dome-shaped housing, from where the lighting unit can illuminate up to 360° in a vertical plane and up to 180° in a horizontal plane. This can be done over several permanently installed lighting units, or the installed lighting unit can make a movement to change the direction of light propagation.

Other suitable positions for lighting units are parts of the A-pillar, the B-pillar and/or the C-pillar, areas of door components such as doors, door frames, windows, window frames and/or corresponding covers, in particular paneling.

The features disclosed in this description, the claims and the figures form the basis for the claimed disclosure, both individually and in any combination with each other, for the respective different embodiments.

REFERENCE SIGN LIST 1 review device
3 eye tracking sensor
5 surveillance area
7 TOF sensor
9 surveillance area
11, 13, 15, 17 step
19 head
21 upper body
23 steering wheel
25 eyes
102 lighting unit
103, 103', 103", 103''', 103'''' light source
104 optical system
105, 105', 105", 105''', 105'''' optical element
106 motor vehicle
107 sensor
109 vehicle occupant
111, 111', 111" handle
113 vehicle occupant seat
115 roof liner area
190 head
210 upper body
211, 212 shoulder
250 eyes
A, A', B, B' illumination boundary
N near field
F far field
1* shoulder rotation to the right
2* head rotation to the left with an angle +y°
3* head rotation to the right with an angle −y°
4* head tilting down with an angle x°

What is claimed is:

1. A method for controlling a motor vehicle by a drive assistance system comprising:
   receiving, from a sensor, a signal value, wherein the sensor comprises at least one of a time-of-flight (TOF) sensor, an eye tracking sensor or a camera provided with its own lighting unit;
   determining, by the drive assistance system, two or more attention characteristics of a motor vehicle occupant based on the signal value;
   determining, by the drive assistance system, a movement pattern of the motor vehicle occupant from the two or more attention characteristics, wherein the movement pattern of said motor vehicle occupant is determined by a combination of a head position or a head angle and an upper body movement or rotation, wherein the upper body movement or rotation is a shoulder movement or rotation, and wherein the movement pattern corresponds to a first attention state,
   determining whether the first attention state corresponds to an inattentive state, wherein the inattentive state is evaluated by artificial intelligence from a plurality of stored images, wherein the plurality of stored images is at least one of simulated, learned, or self-learned images; and
   controlling the motor vehicle by the drive assistance system in a first way when the first attention state corresponds to the inattentive state.

2. The method according to claim 1, wherein the sensor is supported by at least one of a separate or distant lighting unit to actively illuminate an area in front of the sensor, and wherein the at least one of the separate or distant lighting unit emits electromagnetic radiation outside of a range visible to the motor vehicle occupant.

3. The method according to claim 1, wherein at least one of:
   an illumination of different areas in an interior of the motor vehicle depends on a condition of the motor vehicle occupant, the motor vehicle and an environment of the motor vehicle, or
   the illumination of different areas in the interior of the motor vehicle depends on a the distance of the motor vehicle occupant to the sensor.

4. The method according to claim 2, wherein one or more of the sensor or the at least one of the separate or the distant lighting unit is attached to or integrated in at least one of a dashboard, a center console, a retractable or a movable center console, a windscreen, a roof, a headlining, a grab handle, an A-pillar, a B-pillar, a C-pillar, a door component, above a door, a dome-shaped housing in the region of the center of the motor vehicle on the roof or headlining, a display device, a vehicle occupant seat, a head portion of the vehicle occupant seat, a foot portion of the vehicle occupant seat, an armrest of the vehicle occupant seat, a restraint system for the vehicle occupant, a positioning mechanism, a trim or a mobile device.

5. The method according to claim 1, further comprising the step of:
  in response to determining that the attention state does not correspond to the first attention state, controlling the drive assistance system in a second way.

6. A device for controlling a drive assistance system of a motor vehicle, comprising a processor unit which is configured to carry out the steps of the method according to claim 1.

7. A system for controlling at least one drive assistance system of a motor vehicle, comprising:
  at least one device according to claim 6;
  at least one sensor; and
  at least one of a separate or a distant lighting unit.

8. The system according to claim 7, wherein the sensor further comprises at least one of, a body tracking sensor, or at least one surround view system.

9. A motor vehicle comprising at least one device according to claim 6.

10. A motor vehicle comprising at least one system according to claim 7.

11. A method for controlling a drive assistance system of a motor vehicle, comprising:
  receiving, from a sensor, at least two signal values representing two or more attention characteristics of a motor vehicle occupant, wherein the sensor comprises at least one of a time-of-flight (TOF) sensor, an eye tracking sensor or a camera provided with its own lighting unit;
  weighting the at least two signal values depending on the two or more attention characteristics;
  determining, based on weighting of the at least two signal values, an attention state of the motor vehicle occupant;
  determining whether the attention state of the motor vehicle occupant corresponds to a first attention state or a second attention state;
  in response to determining that the attention state corresponds to the first attention state, controlling the drive assistance system in a first way; and
  in response to determining that the attention state corresponds to the second attention state, controlling the drive assistance system in a second way,
  wherein the first attention state or the second attention state of said motor vehicle occupant is determined by a combination of a head position or angle and an upper body movement or rotation, and
  wherein the upper body movement or rotation is a shoulder movement or rotation.

12. The method of claim 11, wherein the second attention state of the motor vehicle occupant is also determined based on an eye tracking.

13. The method of claim 11, wherein the second way includes a brake assistance of the drive assistance system.

14. The method of claim 11, wherein at least one of the head position or angle or the upper body movement or rotation is determined based on a comparison with a plurality of stored images.

15. The method of claim 12, wherein at least one of the head angle position, the upper body angle position, or the eye tracking are determined based on a comparison with a plurality of stored images.

16. The method of claim 14, wherein the plurality of stored images is at least one of simulated, learned, or self-learned through artificial intelligence.

* * * * *